US007209959B1

(12) United States Patent
Campbell et al.

(10) Patent No.: US 7,209,959 B1
(45) Date of Patent: Apr. 24, 2007

(54) APPARATUS, SYSTEM, AND METHOD FOR COMMUNICATING TO A NETWORK THROUGH A VIRTUAL DOMAIN PROVIDING ANONYMITY TO A CLIENT COMMUNICATING ON THE NETWORK

(75) Inventors: Douglas A. Campbell, Henderson, NV (US); Alan B. Hamor, Pennington, NJ (US); Mike D. Helton, Las Vegas, NV (US)

(73) Assignee: WK Networks, Inc., Pennington, NJ (US)

( * ) Notice: Subject to any disclaimer, the term of this patent is extended or adjusted under 35 U.S.C. 154(b) by 0 days.

(21) Appl. No.: 09/542,858

(22) Filed: Apr. 4, 2000

(51) Int. Cl.
*G06F 15/16* (2006.01)

(52) U.S. Cl. .................. 709/219; 709/203; 709/227

(58) Field of Classification Search ............... 709/219, 709/203, 227, 228, 229; 713/200, 201
See application file for complete search history.

(56) References Cited

U.S. PATENT DOCUMENTS

| 5,926,549 | A | * | 7/1999 | Pinkas ................. 713/168 |
| 5,931,912 | A | * | 8/1999 | Wu et al. .............. 709/224 |
| 5,961,593 | A | * | 10/1999 | Gabber et al. ......... 709/219 |
| 6,014,660 | A | * | 1/2000 | Lim et al. .................. 707/3 |
| 6,014,698 | A | | 1/2000 | Griffiths |
| 6,026,445 | A | | 2/2000 | Kephart et al. |
| 6,098,111 | A | * | 8/2000 | Maegawa et al. ......... 719/310 |
| 6,119,171 | A | * | 9/2000 | Alkhatib ............... 709/245 |
| 6,182,148 | B1 | * | 1/2001 | Tout ...................... 709/245 |
| 6,185,626 | B1 | | 2/2001 | Chivi et al. |
| 6,189,030 | B1 | | 2/2001 | Kirsch et al. |
| 6,205,489 | B1 | | 3/2001 | Kapoor |
| 6,256,739 | B1 | * | 7/2001 | Skopp et al. ............. 726/2 |
| 6,262,976 | B1 | | 7/2001 | McNamara |
| 6,338,082 | B1 | | 1/2002 | Schneider |
| 6,353,850 | B1 | | 3/2002 | Wies et al. |
| 6,442,687 | B1 | * | 8/2002 | Savage .................. 713/156 |
| 6,493,765 | B1 | * | 12/2002 | Cunningham et al. ...... 709/245 |
| 6,496,931 | B1 | * | 12/2002 | Rajchel et al. .......... 713/168 |
| 6,510,464 | B1 | * | 1/2003 | Grantges et al. ......... 709/225 |
| 6,751,677 | B1 | * | 6/2004 | Ilnicki et al. ........... 719/316 |
| 6,785,705 | B1 | * | 8/2004 | Kocherlakota .......... 709/203 |
| 6,910,180 | B1 | * | 6/2005 | Cui et al. ............... 715/513 |

OTHER PUBLICATIONS

"Darpa Internet Program Protocol Specification," Internet Protocol, Sep. 1981; pp. 1-45.
RFC 1034, "Domain Names—Concepts and Facilities," Network Working Group, P. Mockapetris, ISI, Nov. 1987; pp. 1-37
RFC 1035, "Domain Names—Implementation and Specification," Network Working Group, P. Mockapetris, ISI, Nov. 1987; pp. 1-38.
International Preliminary Examination Report dated Aug. 8, 2002, issued by IPEA/US.

* cited by examiner

*Primary Examiner*—Van Nguyen
(74) *Attorney, Agent, or Firm*—Morgan & Finnegan, L.L.P.

(57) ABSTRACT

The present invention is an apparatus, system and method for communicating to a network through an ad hoc virtual domain. The present invention contains a deceiver, a controller, and a forwarder through which a client communicates through. The deceiver, controller, and forwarder collectively establish the domain in which the ad hoc virtual namespace will exist. This invention allows clients to interact over a network in a fashion that is anonymous and unique to the session which the client is engaging in.

26 Claims, 4 Drawing Sheets

APPARATUS, SYSTEM, AND METHOD FOR COMMUNICATING TO A NETWORK THROUGH A VIRTUAL DOMAIN PROVIDING ANONYMITY TO A CLIENT COMMUNICATING ON THE NETWORK

SCOPE OF THE INVENTION

This invention relates generally to networks and network systems, and more specifically to a system and method for enabling anonymous network activity, while establishing virtual namespaces for clients.

BACKGROUND

The proliferation and expansion of computer systems, networks, databases, the Internet, and particularly the World Wide Web (WWW), has resulted in a vast and diverse collection of information and means of communication. The current Internet infrastructure involves millions of computers linked together on a computer network. This network allows all of the computers to communicate with one another. Clients are typically linked to the Internet via Internet Service Providers (ISP's), which in turn connect to larger ISP's. This allows numerous clients to communicate to each other through their various connections.

In general, all the machines on the Internet can be categorized into two types: servers and clients. Typically, machines that provide services (like Web servers, FTP servers, Email servers, etc.) are servers. Servers are loaded with the appropriate software in order to allow them to perform their intended services. Machines that request information from servers are typically called clients. In order to differentiate between machines on the network, each machine is given a unique address called an IP address.

The IP address is a thirty-two bit number that is normally expressed as 4 octets in a dotted decimal number (e.g., 192.168.1.101). Each of the octets can have values between 0 and 255 ($2^8$ possibilities per octet). When a client connects to the Internet, the client is assigned an IP address through their Internet Service Provider (ISP) for the duration of the connection. Conversely, the IP addresses of servers are relatively static, and do not change very often.

Because it is difficult for clients to remember IP addresses, and because IP addresses need to change, most servers on the Internet possess domain names (e.g., "www.whoknowz.com") to help users reach their intended servers without remembering strings of numbers. Name servers, used in the domain name system (DNS), map the human-readable names into IP addresses to help clients reach their destinations. When a client enters a domain name, the browser (via a resolver) extracts the domain name and passes it to a name server, which will return the correct IP address to the associated site. The Domain Name System is comprised of a distributed database and name servers that access that database.

One of the main problems with the current utilization of IP addresses and domain names on the World Wide Web (WWW) is that the WWW is based largely on the hypertext transport protocol ("HTTP-protocol"). The nature of HTTP-protocol allows information, such as a client's e-mail address, web sites that were visited, and information on the client's software and host computer, to be recorded and traced by the server. This opens up the user to a range of privacy threats including unwanted e-mails, solicitations, and "cookies" (data that is stored on the client's machine by a server and subsequently used for identification). Furthermore, clients that wish to cloak themselves from such intrusions are forced into systems that simply provide alternate account identities for the client; while the client is protected, the alternate account identity becomes the object of the unwanted e-mails, "cookies", etc. instead. The effect of this is similar to the client manually creating a new user account in which to browse the WWW.

One of the solutions available is to route the client through a proxy server in order to substitute IP information being sent by the client. When a client desires to visit a web server, the packets sent from client's computer are routed through a proxy server. At the proxy server, the server executes algorithms to extract information that would identify the client, and replaces the information with predetermined substitutes. Afterwards, the proxy server routes the packet out to the web server. Once the web server receives the packet, all of the information points back to the proxy server, and not to the client. This in effect "hides" the client from the web server.

However, a drawback to such systems is that, as mentioned before, the client is obtaining protection merely through the use of an alternate identity that is ultimately assigned back to the same client. Furthermore, current systems do not have any added flexibility designed in the system to take advantage of anonymous client group browsing or multiple group association. In order to fully take advantage of ad hoc identity browsing, additional features need to be added in order to create a "community-like" environment among numerous anonymous clients.

SUMMARY OF THE INVENTION

To address the above-discussed deficiencies in existing systems, the present invention involves the use of three algorithms, known collectively as DNS Misdirection and individually as the deceiver, the controller, and the forwarder. The deceiver communicates with clients and with the controller. The deceiver provides name resolution for clients. The routine works the same as a standard name server, except when a query is received from a client, the deceiver allows the controller to supply the information. The controller communicates with the deceiver and the forwarder. The controller determines the address, "time to live" (TTL), and other DNS result fields and returns them to the deceiver. The controller is queried by the forwarder for the site address that the client intended to reach.

One advantage of the invention deals with isolating client activity on the Internet. Another important feature of the invention is that the DNS Misdirection system allows for the creation of virtual namespaces. Through these namespaces, the isolated clients can anonymously browse the Internet while being part of a virtual community. By utilizing virtual namespaces and generated root domain names (e.g., "carlover", "winetaster", "stockpicker"), the community activities would be inaccessible to all but intended clients. Furthermore, since virtual namespaces would create a domain through which clients could identify themselves and communicate through, network administrators could establish ad hoc software applications as well as domain-specific identifiers that could be assigned to a user or groups of users.

BRIEF DESCRIPTION OF THE DRAWINGS

The following drawings illustrate certain embodiments of the present invention.

DETAILED DESCRIPTION

Figure 1:
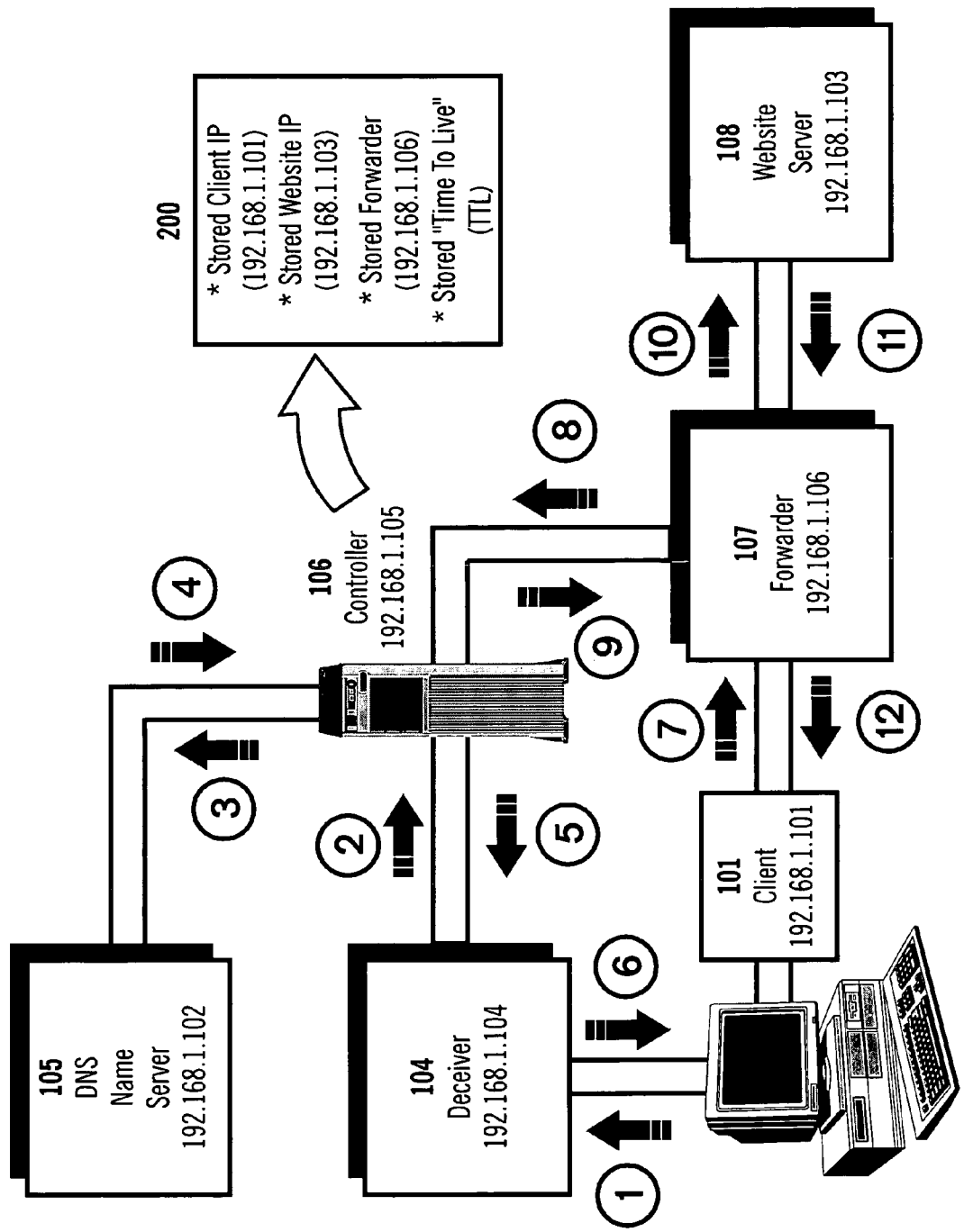
FIG. 1 schematically shows the system architecture of an exemplary network on which one embodiment of the invention may be implemented.

FIG. 1 illustrates an embodiment of the system architecture that contains at least one client (101). This client consists of a personal computer, which contains an interface to a computer network, such as a modem, network interface card, etc. The client (101) may also be generalized as any client application. Loaded in the client computer (101) are an Internet browser and a resolver (not shown). When the client (101) wishes to connect to a site on the Internet, the client (101) will typically enter a destination site domain name into the computer's Internet browser (e.g., "www-.whoknowz.com"). In FIG. 1, the destination site is a web server (108). The Internet browser will typically be connected through an ISP (not shown). The domain name can be embedded in a URL (via hyperlink), or can be explicitly entered by the client.

If the client (101) is to reach the web server (108), the client needs to obtain the web server's (108) IP address, shown in FIG. 1 (all of the hypothetically disclosed IP addresses in the invention are shown in the figure). With the architecture used in existing systems, the IP address must be resolved into a 32 bit (IPv4)/128 bit (IPv6) IP address. Normally, the ISP will furnish the clients with a DNS (105), which is accessed through the client's resolver. The resolver is typically predisposed with two IP addresses, which represent the primary and secondary name servers that may be accessed. The name of the server may be entered manually, or may be provided by using Dynamic Host Configuration Protocol (DHCP). The process of resolving domain names, and the operation of DNS servers is addressed further in detail in RFC 1034 ("Domain Names—Concepts and Facilities"—last update: Nov. 17, 1999), and RFC 1035 ("Domain Names—Implementation and Specification"—last update: Nov. 17, 1999).

Figure 2:
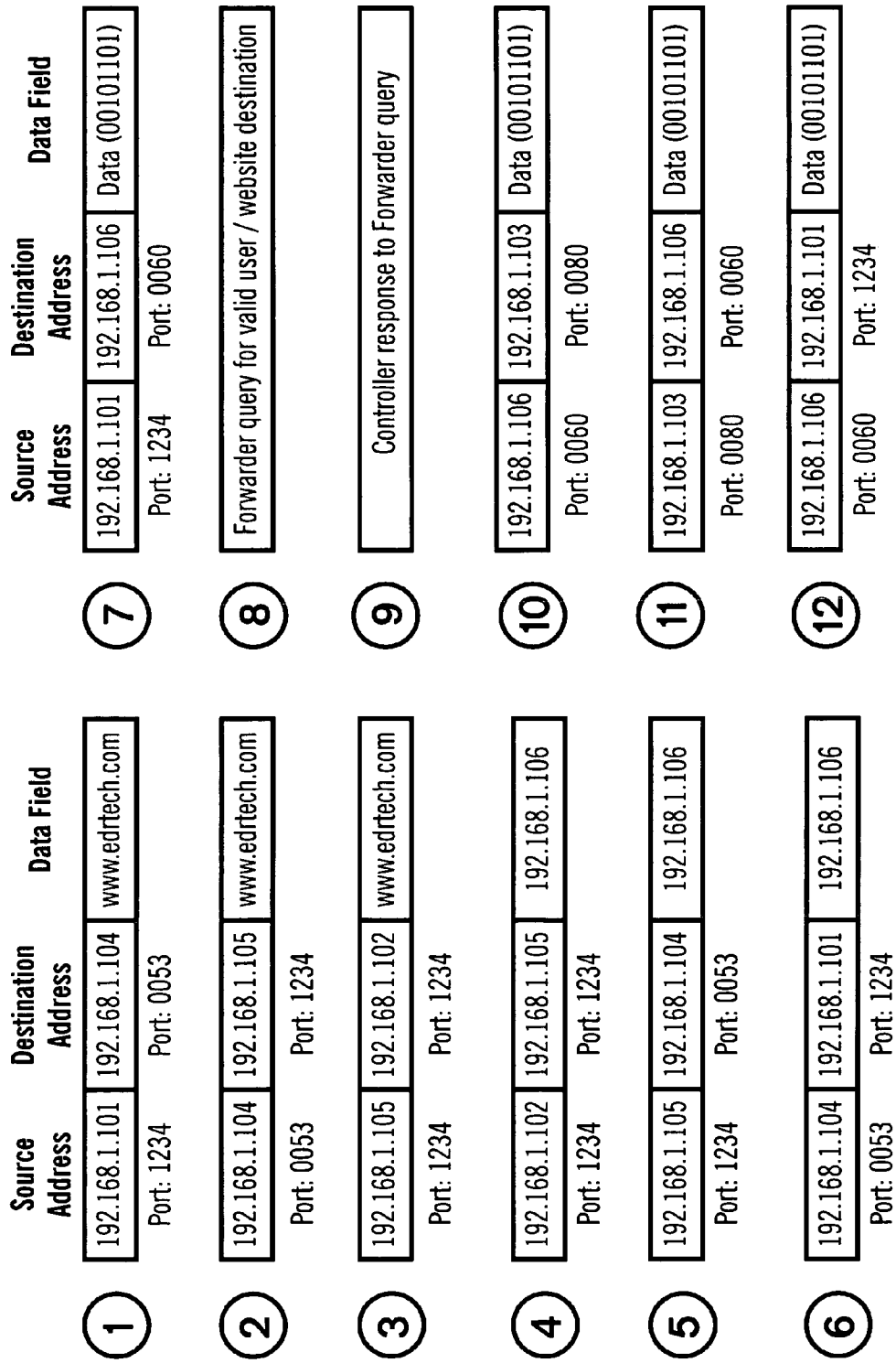
FIG. 2 illustrates the packet contents as they are routed through the network.

Under the current invention, when an unresolved packet is sent from client (101), the packet is processed through the deceiver (104). A more detailed representation of the packet, as well as exemplary port connections, is shown in FIG. 2. It should be pointed out that the term "packet" may mean an IP packet, an UDP datagram, or other transmitted data. When the packet (1) is transmitted, the packet will be transparently addressed to the deceiver (104). Upon receipt of the packet, the deceiver (104) will recognize the source of the packet (1) through the IP source address, shown in FIG. 2. The fields in which the IP source and destination addresses function are described in greater detail in RFC 791 ("DARPA Internet Program Protocol Specification"). By parsing the data field through the controller (106), the deceiver will determine the intended domain name that the client (101) wants to reach.

From this point, the deceiver (104) queries the controller (106) to initiate a name resolution. The controller (106) then sends the packet (2) where the IP destination address of the DNS (105) is now placed in the packet (2), and is transmitted onward. In the meantime, the controller (106) stores the client's (101) IP location, and determines a name-to-IP address time-to-live (TTL). The TTL is the time period in which the client (101) may assume a valid name-to-IP address. The TTL of the name-to-IP address may be established through the use of cache, or any other suitable memory available. Typically, the TTL field is a 32 bit integer that represents units of seconds, and is primarily used by resolvers when they cache network resource records. The TTL describes how long a resource record can be cached before it should be discarded. The TTL may be assigned by the administrator for the zone where the data originates. Under the present invention, once the TTL expires, the client must perform another query in order to establish a connection with an IP address.

Upon receipt of the packet (2), the controller (106) determines the source of the packet, and subsequently proceeds to process the domain name resolution request, and queries the DNS name server (105) in packet (3) to obtain the website server (108) IP address. When the destination website IP address is resolved in the DNS (105), it is transmitted back to the controller (106) in packet (4). When the controller (106) obtains the IP address of the destination website server (108), the controller (106) then proceeds to establish connection with a forwarder (107) through which to communicate through. Once connected, the controller (106) then records the IP address of the forwarder (107). The forwarder's (107) address is then used by the controller (106) to create a valid session for the client (101), by correlating the forwarder address with the TTL of the client (101) and the destination website server (108). As long as the client's name-to-IP-address has not expired (i.e., the TTL has not run out), the controller (107) will associate the established forwarder (107) with the session. After connecting with a forwarder (107), the controller (106) then proceeds to store the client (101) IP address, the destination website (108) IP address, the IP address of the forwarder (107), and the determined TTL. The stored elements (200) are disclosed in FIG. 1.

After storing the pertinent information, the controller (106) then returns the forwarder (107) IP address back to the deceiver (104) via packet (5). The contents of packet (5) are shown in FIG. 2. After the packet (5) is routed through the deceiver (104), the packet (6) is then transmitted to the client (101), along with the TTL. Upon receipt of the packet (6), the client will be "deceived" into thinking that the forwarder (107) IP address is actually the destination website server (108). At this point, any communication between the client (101) and the website server (108) will be taking place in a virtual domain, since both the client (101) and the website server (108) do not technically exist to each other—the client is isolated from the destination sites of his or her data packets, and the destination sites are isolated from the clients that are accessing the site.

One advantage of this configuration is that the virtual namespaces allow system administrators and clients to create a virtually endless string of identities for clients and their target website server(s). For example, a virtual namespace may be set up as ".bank", thus identifying a bank classification. If a client wishes to visit a server that is known to be related to banks, the client could type "wellsfargo.bank" and be routed to "wellsfargo.com" via the system described in FIG. 1. Alternately, a client could enter "*.bank" and receive an HTML page with all registered entries. Furthermore, the client could customize the identification used on the Internet (e.g., "wellsfargo.doug"). Names could be created ad hoc or could be associated with groupware (e.g., "mother.birthday-.card"; "smith.family.reunion.newyork"). The variations are virtually endless.

Some of the implementations of the virtual namespaces and underlying domains include, but are not limited to:
(1) creating unique environments for marketing, branding, advertising and promotion purposes;
(2) allowing for personalized Web identities for individuals, corporations, organizations, etc.;
(3) providing anonymous browsing, searching and e-mailing;
(4) creating environments for users to establish groups for collaborative communication or application purposes;
(5) cataloguing domain names under intuitive categories or functions (e.g. "bestbuy.shop, "amazon.shop", etc.)
(6) creating a search index which allows the user(s) to locate all members of a specific category and identifying distinct products, goods, services, content, or information provided by any ember of any category and/or identification.
(7) creating directories that contain telephone, Internet, fax, wireless, page, cellular, e-mail, instant messaging and/or similar data under one or more human readable formats addressable by a communication device.

When the client makes a transmission to the website server (108), the packet (7) is now routed to the forwarder (107). The client (101) will typically connect to the forwarder (107) through a well-known port. After receiving the packet from the client (101), the forwarder (107) proceeds to query the controller (106) (shown as packet (8)) to determine: (1) whether the client (101) is valid; (2) if the TTL has not expired; and (3) if the IP address of the website server (108) that the client wishes to connect to is valid. If everything is confirmed, the controller (106) then sends back the relevant information via packet (9). The forwarder (107) then extracts the needed information including the website server (108) IP address, and forwards the packet on to it's intended destination.

It should be understood that the deceiver (104), the controller (106), and the forwarder (107) are applications. The website server (108) may be generalized as any server application. Furthermore, the deceiver (104), the controller (106), and the forwarder (107) can all be on a single computer, or separate computers.

Also, the deceiver (104) and the controller (106) can be on the client's computer.

Figure 3:
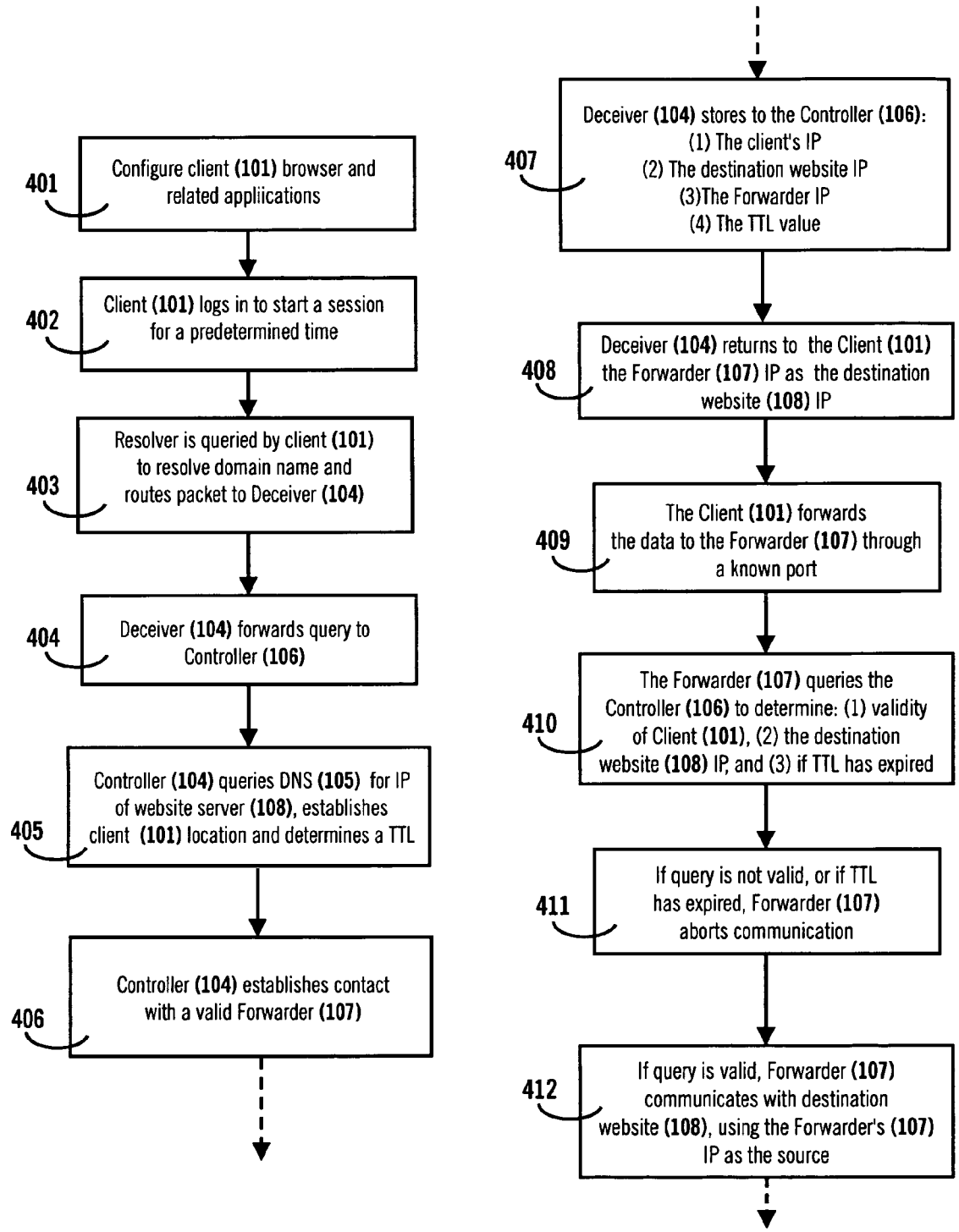
FIG. 3 generally provides a flowchart representation of a client sending a packet to be resolved, and the subsequent misdirection of the client to a destination website via the present invention.
Figure 4:
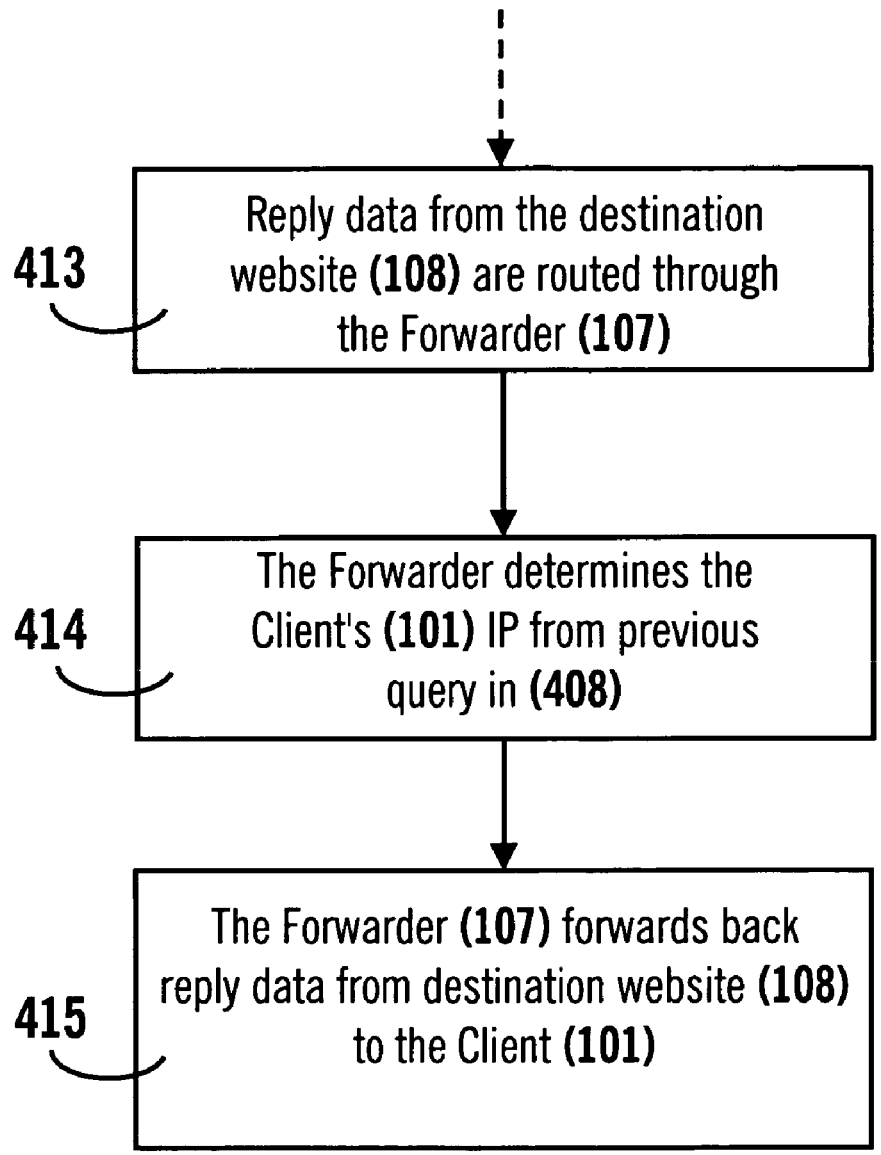
FIG. 4 generally provides a flowchart representation when the website server responds back to the client through the invention.

FIGS. 3–4 represent a flowchart representation of the invention as previously disclosed in FIGS. 1–2. In step (401), the client configures software/hardware on the client computer, and establishes a session by signing on or logging into a network for a predetermined time (402). When the client wishes to transmit data onto the network, or otherwise communicate with other computers or servers, one option available for the client is to query the resolver in order to retrieve an intended destination site (403). In (403), the resolver query is routed to the deceiver. After receiving the contents of the resolver, the deceiver then forwards the query to the controller in (404).

When the controller receives the query packet, the controller next records the location of the client, determines the TTL for the client session, and further queries a DNS name server, and receives back the IP address of the website which the client wishes to contact (405). In (406), the controller then establishes contact with an available forwarder through which the client session may be transmitted through, and subsequently records the IP address. While it is not displayed in the flowchart, if the controller determines that: (1) a TTL has expired; (2) an invalid client is sending the query; (3) a valid forwarder is unavailable; or (4) a desired website destination is invalid, or any combination thereof, the controller aborts the remainder of the process and transmits the appropriate message or subroutine to the client. If everything is determined to be valid, then the controller proceeds to store into memory the client's IP address, the destination website IP address, the forwarder IP address, and the TTL (407).

In step (408), the controller sends back to the deceiver the forwarder IP address, that is masquerading as the destination website IP address. The deceiver in turn sends the data back to the client (409), where the client then connects with the forwarder through a known port. The forwarder next queries the controller to determine the validity of the client, the status of the TTL, and the IP address of the website which the client is trying to reach (410). Just like the controller, if the forwarder determines at this point that: (1) a TTL has expired; (2) an invalid client is sending the query; or (3) a desired website destination is invalid, or any combination thereof, the forwarder aborts the remainder of the process, and transmits the appropriate message or subroutine back to the client (411). If everything is determined to be valid, the forwarder will proceed to transmit the client's data to the destination website server (412).

Once the destination website receives the data from the client, the server will only recognize the forwarder as the source, and thus would only communicate back to the client via the forwarder. Accordingly, if the website server requires to communicate back to the client, the data is routed through the forwarder (413). When data is received by the forwarder, the forwarder, in principle, reverses the process disclosed in (410) to determine the source client which is intended to receive the website server's data (414). The data may be of any kind including, but not limited to, text, programs, applets, video, audio, etc. Once the forwarder determines the client's proper IP address, the forwarder then transmits the reply data back to the client (415).

Although the present invention has been described in detail, it is to be understood that various changes, alterations, and substitutions can be made without departing from the spirit and scope of the invention. More particularly, it should be apparent to those skilled in the pertinent art that the above described invention is algorithmic and is executable by a suitable conventional computer system or network. Alternate embodiments of the present invention may also be suitably implemented, at least in part, in firmware or hardware, or some suitable combination.

We claim:

1. A method comprising:
in response to a request by a client to initiate communication with a destination website;
setting up a forwarding session between the client and a destination server corresponding to the destination website, the forwarding session employing a forwarder disposed between the client and the destination server to forward packets sent from the client to the destination server and to forward packets sent from the destination server to the client;
employing the forwarder to transfer packets between the client and the destination server during the forwarding session, wherein the forwarding session is set up and implemented such that neither the client or the destination server is aware of the employment of the forwarder;
employing a controller configured to communicate with the forwarder and a domain name server, wherein the controller queries the domain name server to resolve the name of the destination website associated with the destination server and initiates communication with the forwarder in response to an answer from the domain name server to resolve the name of the destination website associated with the destination server;

employing a deceiver configured to communicate with the controller and the client, wherein the deceiver receives the request by the client to initiate communication with the destination website and initiates the controller to query the domain name server to resolve the name of the destination website associated with the destination server; and in response to the controller receiving the answer from the domain name server and initiating communication with the forwarder, initiating the forwarding session.

2. The method of claim 1, wherein the forwarder is unaware of an identity of the client outside of the session.

3. The method of claim 1, wherein the forwarder is unaware of an identity of a user or alias of a user of the client during the forwarding session.

4. The method of claim 1, wherein the forwarding session exists for a limited period of time.

5. The method of claim 4, wherein the data from the forwarding session exists on a time to live basis.

6. The method of claim 4, wherein data concerning the forwarding session is discarded from the forwarder at the completion of the forwarding session.

7. The method of claim 1, wherein the client is unaware that it is in communication with the forwarder in place of the destination server.

8. The method of claim 1, wherein the destination server is unaware that it is in communication with the forwarder in place of the client.

9. The method of claim 1, wherein a verification request from the forwarder is transmitted to the controller and confirmed before the forwarder transfers packets between itself and the destination server.

10. The method of claim 1, wherein the request by the client to initiate communication with the destination website includes a request to resolve an IP address of a website server that the client is intending to reach.

11. The method of claim 10, wherein the controller stores an IP address that represents the origin of the client.

12. The method of claim 10, wherein the controller stores an IP address of the website server that the client is intending to reach.

13. The method of claim 10, wherein the controller stores an IP address that represents the location of the forwarder.

14. The method of claim 10, wherein the controller stores a time-to-live function for the forwarding session.

15. The method of claim 10, wherein the controller stores an IP address of the website server that the client is intending to reach and an IP address that represents the location of the forwarder, further comprising:

interchanging the IP address of the website server with the IP address of the forwarder.

16. A computer system comprising:

a forwarder configured to transmit and receive data;

said forwarder configured to communicate with at least a client and at least a destination server corresponding to a destination website with which the client has requested to initiate communication;

said forwarder configured for employment between the client and the destination server to forward packets sent from the client to the destination server and to forward packets sent from the destination server to the client;

said forwarder configured to transfer packets between the client and the destination server, wherein the client and the destination server are unaware of the employment of said forwarder;

said forwarder configured to communicate with at least a controller;

said controller configured to communicate with at least a deceiver, said deceiver configured to communicate with the client, wherein the deceiver receives the request by the client to initiate communication with the destination website and initiates the controller to query a domain name server to resolve the name of the destination website associated with the destination server;

said controller configured to communicate with said domain name server to resolve the name of said destination website and initiate communication with the forwarder in response to the resolution of the name of the destination website associated with the destination server;

said controller configured to store communication data for locating at least said deceiver, said domain name server, and said forwarder; and said controller configured to initiate the forwarder to forward packets between the destination server and the client in response to the resolution of the name of the destination website associated with the destination server.

17. The computer system according to claim 16, wherein said forwarder is configured to transmit verification data to said controller.

18. The computer system according to claim 16, wherein said controller sends destination instructions to said domain name server, receives data including resolved a website name associated with said destination instructions.

19. The computer system according to claim 18, wherein said controller establishes communication with said forwarder upon receiving data from said domain name server.

20. The computer system according to claim 18, wherein said destination instructions include data comprising an IP address of a destination website that said client is intending to communicate with.

21. The computer system according to claim 16, wherein said controller stores IP addresses for at least said deceiver, said domain name server, and said forwarder.

22. The computer system according to claim 16, wherein said controller receives destination instruction from the deceiver and transmits the destination instruction to the domain name server.

23. The computer system according to claim 16, wherein said deceiver causes said client to communicate with said forwarder, instead of an intended destination server.

24. The computer system according to claim 16, wherein said forwarder communicates data with said destination server corresponding to data communicated between said forwarder and said client.

25. The computer system according to claim 16, wherein said controller correlates communication of said forwarder with at least said client and said destination server.

26. The computer system according to claim 16, wherein said controller determines and stores an association of name to IP address for said client.

* * * * *